No. 761,495. PATENTED MAY 31, 1904.
C. F. JAEHN.
DRIVING GEAR.
APPLICATION FILED FEB. 23, 1904.
NO MODEL.
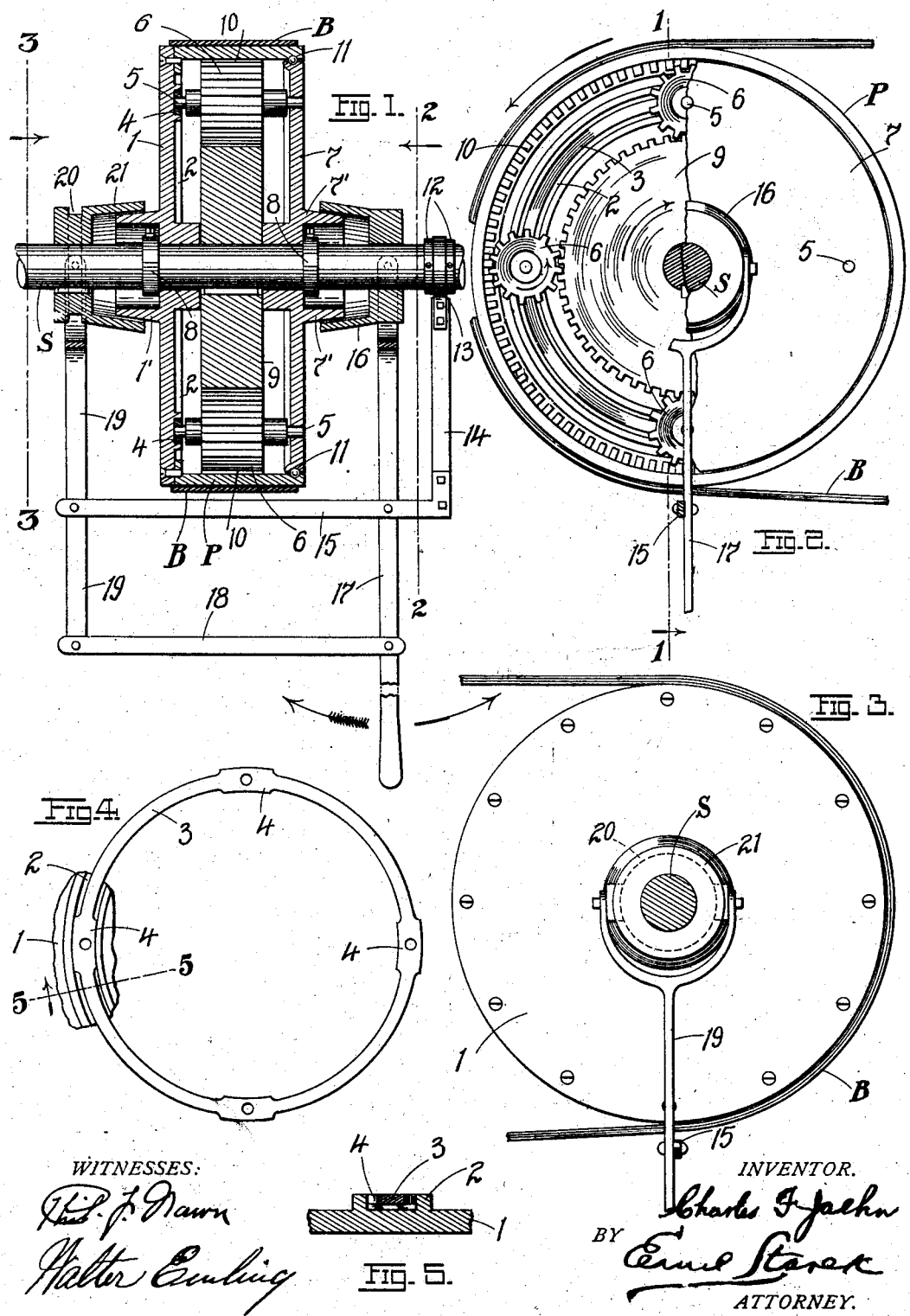
WITNESSES:
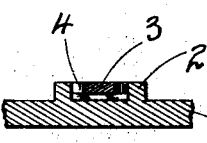
INVENTOR.
Charles F. Jaehn
BY Ernst Starek
ATTORNEY.
THE NORRIS PETERS CO., PHOTO-LITHO., WASHINGTON, D. C.

No. 761,495. Patented May 31, 1904.

UNITED STATES PATENT OFFICE.

CHARLES F. JAEHN, OF ST. LOUIS, MISSOURI.

DRIVING-GEAR.

SPECIFICATION forming part of Letters Patent No. 761,495, dated May 31, 1904.

Application filed February 23, 1904. Serial No. 194,869. (No model.)

*To all whom it may concern:*

Be it known that I, CHARLES F. JAEHN, a citizen of the United States, residing at St. Louis, State of Missouri, have invented certain new and useful Improvements in Driving-Gears, of which the following is a full, clear, and exact description, reference being had to the accompanying drawings, forming a part hereof.
My invention has relation to improvements in driving-gear for pulleys; and it consists in the novel construction of gear more fully set forth in the specification, and pointed out in the claims.
In the drawings, Figure 1 is a middle vertical transverse section of the pulley and gear mechanism on the line 1 1 of Fig. 2. Fig. 2 is a vertical section on line 2 2 of Fig. 1, with one-half of the parts beyond the plane of section broken away to show the interior gear mechanism. Fig. 3 is a vertical section on line 3 3 of Fig. 1. Fig. 4 is a detail of the ring supporting the ends of the spindles of the pinions, and a fragment of the way or groove within which the ring is confined; and Fig. 5 is a cross-section on the line 5 5 of Fig. 4.

The object of my invention is to interpose between a drive-shaft and its pulley gear mechanism by which it may be possible to impart to the pulley a motion of rotation either contrary to that of the shaft, so that the necessity of cross-belts shall be dispensed with where it is desirable to impart from said pulley motion to a counter-shaft in such reverse direction, or to impart a motion in the same direction with the shaft when desirable. A further object is to provide means for disengaging the pulley from said shaft, converting the same for the time being into a loose pulley, and bringing the counter-shaft to a standstill.

The present device is a qualification of the construction of gear shown and described in my pending application, Serial No. 174,800, filed September 26, 1903, and is distinguished therefrom in the additional capacity of imparting rotation to the pulley in the same direction as the drive-shaft.

In detail the invention may be described as follows.

Referring to the drawings, S represents a drive-shaft, and P a loose pulley mounted on the same. Secured to one end of the pulley-rim and rotatable with it about the shaft is a cover-plate 1, provided on its inner face with an annular groove or way 2 for the support and free traverse of a ring 3, the latter being provided at intervals with enlarged bearings 4 for the adjacent ends of the spindles 5 of a series of pinions 6, the opposite ends of the spindles being mounted in the rotatable disk 7, whose hub 7' constitutes the male member of a clutch by which said disk is at the proper time arrested in its motion about the shaft, as presently to be seen. The hub 1' of the plate 1 and the hub 7' of the disk 7 are chambered to a suitable depth for the reception of the collars 8 8, which are bolted to the shaft within the respective chambers to retain the parts in proper position on the shaft.

Keyed to the shaft and adapted to mesh with the several pinions 6 is a gear-wheel 9, the pinions likewise meshing with the interior toothed section 10 of the pulley-rim. The periphery of the disk 7 is provided with a groove for the reception of the ball-bearings 11 to reduce the friction incident to the rotation of the pulley about the disk under circumstances presently referred to.

Loosely embracing the shaft between two fixed collars 12 12 at a suitable distance from the disk 7 is a ring or loop 13, from which projects a rigid arm 14, whose end has rigidly secured thereto one end of a bar 15, disposed parallel to the shaft and extending to a point slightly beyond the hub 1'. Loosely sliding on the shaft S opposite the hub 7' is a conical cup 16, constituting the female member of the friction-clutch controlling the disk 7, said member 16 having pivotally secured thereto the forked end of the shifting-lever 17, which is disposed parallel to the arm 14 and pivotally coupled to the bar 15 and to the adjacent end of an outer link 18, whose opposite end is pivotally secured to the adjacent end of a lever 19. The latter is pivotally coupled at an intermediate point to the bar 15 and has its opposite forked end engaging the peripheral groove 20 of a conical cup 21, which constitutes the female member of a clutch, whose male member is formed by the hub 1', which said cup is adapted to receive. The member 21 is slidingly feathered to the shaft S, not only constantly revolving with it, but being free to move longitudinally along the same.

The operation of the device is as follows: With the intermediate position of the shifting-lever, as shown in Fig. 1, both clutches 16 21 are out of engagement with their corresponding male members, (disk 7, plate 1,) in which case both the cover-plate 1, which forms a permanent part of the pulley, and the disk 7 are free to rotate about the shaft, or, more properly speaking, the shaft is free to rotate within them. Then assuming that the shaft S rotates in the direction shown by the arrow, Fig. 2, the gear-wheel 9 will rotate the pinions 6, causing the latter to simply travel around over the toothed section 10 of the pulley (held against rotation by the resistance offered by the tension of the drive-belt B, leading to the machinery to be driven,) the pulley remaining stationary under the circumstances. In thus rolling around on said toothed section 10, the pinions carry the disk 7 about the shaft and the ring 3 with its bearings 4, in which are mounted the adjacent ends of the spindles 5, loosely traverses the groove or way 2, provided for it for this purpose.

If the shifting-lever 17 is swung to the right in Fig. 1, or in the direction of the plain arrow there shown, whereby the cup or clutch 16 is forced into frictional engagement with the hub 7' of the disk 7, thereby holding said disk against possible rotation, the shaft while still rotating in the same direction as before now causes the pinions 6 to drive the pulley in the same direction with them (see arrows in Fig. 2)—that is to say, in a direction contrary to the rotation of the shaft. The pulley is obliged to rotate in the direction thus indicated, since the resistance offered by the clutch 16 to the rotation of the disk 7 is greater than that to be overcome by the pulley in driving its belt and the machinery impelled thereby.

If the shifting-lever 17 is swung to the left in Fig. 1, or in the direction of the feathered arrow there shown, whereby the cup or clutch 21 (which, as previously stated, is slidingly feathered to the shaft and always revolves with it) is forced into frictional engagement with the cover-plate 1, then under those circumstances the clutch 16 releases the disk 7, and the pulley thus coupled to the shaft simply revolves with it in the same direction, the pinions 6 remaining stationary about their axes, (being that the plate 1 and gear-wheel 9 are carried with the shaft simultaneously and at the same angular velocity.) Of course for the intermediate position of the shifting-lever, Fig. 1, both clutches are out of frictional engagement. For one of the extreme positions of the said lever one of the clutches only is in engagement and for the other extreme position of the shifting-lever the opposite clutch only is in engagement, as clearly obvious from the operation and construction set forth.

From the foregoing it is apparent that the driving-gear here shown is serviceable in imparting a motion of rotation to the pulley which shall be, first, direct with the shaft, or, second, contrary to the shaft, or, third, releasing the pulley altogether, whereby the same is loose on said shaft and stationary during rotation of the latter. I may of course depart from the details of construction here set forth without affecting either the nature or spirit of my invention.

Having described my invention, what I claim is—

1. In a driving-gear, a rotatable shaft, a pulley mounted loosely thereon, a gear-wheel fixed to the shaft within the pulley, an interior toothed section formed on said pulley, a series of pinions meshing with the respective toothed surfaces, spindles for the pinions, a disk loosely mounted on the shaft and serving as a bearing for the adjacent ends of the spindles, the opposite ends of the spindles being supported by the pulley, means for holding the disks stationary to impart rotation to the pulley in a direction contrary to the shaft, and means for coupling the pulley to the shaft and simultaneously releasing the disk to impart rotation to the pulley with the shaft, substantially as set forth.

2. In a driving-gear, a rotatable shaft, a pulley mounted loosely thereon, a gear-wheel fixed to the shaft within the pulley, an interior toothed section formed on said pulley, a series of pinions meshing with the respective toothed surfaces, a disk loosely mounted on the shaft and serving as a bearing for the adjacent ends of the spindles of said pinions, a suitable groove or way being formed in the pulley for the opposite ends of the spindles, means for holding the disk stationary to impart rotation to the pulley in a direction contrary to the shaft, and means for coupling the pulley to the shaft and simultaneously releasing the disk to impart rotation to the pulley with the shaft, substantially as set forth.

3. In a driving-gear, a rotatable shaft, a pulley mounted loosely thereon, a gear-wheel fixed to the shaft within the pulley, an interior toothed section formed on said pulley, a series of pinions meshing with the respective toothed surfaces, spindles for the pinions, a disk loosely mounted on the shaft and serving as a bearing for the adjacent ends of the spindles, the opposite ends of the spindles being supported by the pulley, a clutch mounted loosely on the shaft for engaging the disk and holding the latter against rotation, a revolving clutch slidingly feathered to the shaft for engaging the pulley and coupling the latter to the shaft, and means for actuating the clutches whereby the same may be forced alternately into engagement with, or disengagement from, the respective parts immediately controlled thereby, substantially as set forth.

4. In a driving-gear, a rotatable shaft, a pulley mounted loosely thereon, a gear-wheel fixed to the shaft within the pulley, an interior toothed section formed on said pulley, a series of pinions meshing with the respective toothed surfaces, spindles for the pinions, a disk loosely mounted on the shaft and serving as a bearing for the adjacent ends of the spindles, the opposite ends of the spindles being supported by the pulley, a clutch mounted loosely on the shaft for engaging the disk and holding the latter against rotation, a revolving clutch slidingly feathered to the shaft for engaging the pulley and coupling the latter to the shaft, a shifting-lever having one end engaging the first-mentioned clutch, a lever having one end coupled to the rotating clutch, and intermediate connections between the two levers, for permitting the alternate shifting of the respective clutches into engagement with or disengagement from the parts immediately controlled thereby, substantially as set forth.

5. In a driving-gear, a rotatable shaft, a pulley comprising a rim and cover-plate closing one end thereof, loosely mounted on the shaft, a conical hub formed with said cover-plate, a way or groove being formed on the inner face of said plate, a disk confined within the rim of the pulley and free to rotate about the shaft, a series of antifriction-rollers interposed between the periphery of the disk and the inner surface of the pulley-rim, a conical hub formed with said disk, a toothed section formed along the inner surface of the pulley-rim, a gear-wheel keyed to the shaft within the toothed section, a series of pinions respectively meshing with said gear-wheel and the toothed section of the rim, a ring loosely confined within the way of the cover-plate, the spindles of the pinions having their opposite ends respectively supported in said ring and in the disk, a sliding clutch loosely mounted on the shaft for engaging the hub of the disk, a rotary clutch slidingly feathered to the shaft for engaging the hub of the cover-plate, a shifting-lever for the clutches, and suitable connections between the lever and clutches for alternately forcing the latter into engagement with, or retracting the same from, the respective parts immediately controlled thereby, whereby the pulley rotates with, or contrary to the shaft, substantially as set forth.

In testimony whereof I affix my signature in presence of two witnesses.

CHARLES F. JAEHN.

Witnesses:
 EMIL STAREK,
 G. L. BELFRY.